US00RE44862E

(19) United States
(12) Reissued Patent
Wright et al.

(10) Patent Number: US RE44,862 E
(45) Date of Reissued Patent: Apr. 22, 2014

(54) METHOD FOR MATCHING A GOLFER WITH A PARTICULAR CLUB STYLE

(75) Inventors: Ian C. Wright, Calgary (CA); David Anderson, Hoffman Estates, IL (US); Peter J. Roberts, Carlsbad, CA (US); Benoit Vincent, Encinitas, CA (US)

(73) Assignee: Taylor Made Golf Company, Inc., Carlsbad, CA (US)

(21) Appl. No.: 13/085,340

(22) Filed: Apr. 12, 2011

Related U.S. Patent Documents

Reissue of:

(64) Patent No.: 7,887,440
Issued: Feb. 15, 2011
Appl. No.: 11/431,145
Filed: May 8, 2006

U.S. Applications:

(63) Continuation of application No. 10/116,688, filed on Apr. 3, 2002, now Pat. No. 7,041,014.

(60) Provisional application No. 60/281,850, filed on Apr. 5, 2001.

(51) Int. Cl.
*A63B 57/00* (2006.01)

(52) U.S. Cl.
USPC ..... 473/409; 473/131; 473/222; 473/223; 473/289; 473/290; 473/407

(58) Field of Classification Search
USPC ..... 473/131, 223, 289–290, 407, 409
See application file for complete search history.

(56) References Cited

U.S. PATENT DOCUMENTS 3,792,863 A 2/1974 Evans
3,945,646 A 3/1976 Hammond (Continued)

FOREIGN PATENT DOCUMENTS

WO WO 99/49944 10/1999
WO WO 00/15311 3/2000

(Continued)

OTHER PUBLICATIONS

Office Action from the United States Patent & Trademark Office in pending U.S. Appl. No. 13/027,201, dated Mar. 14, 2012.

(Continued)

*Primary Examiner* — Dmitry Suhol
*Assistant Examiner* — Ryan Hsu
(74) *Attorney, Agent, or Firm* — Klarquist Sparkman, LLP

(57) ABSTRACT

A method is disclosed for matching a test golfer with a particular golf club selected from a group of golf clubs having a plurality of styles. The method utilizes data set derived in an initial procedure in which the club style preferences for each of a large number of pre-test golfers is recorded and correlated with a set of performance parameters for the golf swings of such pre-test golfers. This data enables the pre-test golfers to be classified into subgroups, in which golfers within the same subgroup generally prefer the same club style and golfers in different subgroups generally prefer different club styles. After this data set has been established, the test golfer takes a golf swing with a golf club, while performance parameters for the swing are measured. Based on the measured performance parameters and the previously established data set, the test golfer is classified according to swing type, and the optimum golf-club is then selected from the plurality of styles of golf clubs.

29 Claims, 12 Drawing Sheets

(56) References Cited

U.S. PATENT DOCUMENTS

| | | | | | |
|---|---|---|---|---|---|
| 4,059,270 | A | | 11/1977 | Sayers | |
| 4,137,566 | A | | 1/1979 | Haas et al. | |
| 4,375,887 | A | | 3/1983 | Lynch et al. | |
| 4,615,526 | A | | 10/1986 | Yasuda et al. | |
| 4,631,676 | A | | 12/1986 | Pugh | |
| 5,108,103 | A | * | 4/1992 | Rilling | 473/213 |
| 5,111,410 | A | * | 5/1992 | Nakayama et al. | 434/258 |
| 5,114,150 | A | | 5/1992 | Matsumura | |
| 5,210,603 | A | | 5/1993 | Sabin | |
| 5,246,232 | A | | 9/1993 | Eccher et al. | |
| 5,249,967 | A | | 10/1993 | O'Leary et al. | |
| 5,257,084 | A | | 10/1993 | Marsh | |
| 5,337,758 | A | | 8/1994 | Moore et al. | |
| 5,342,054 | A | | 8/1994 | Chang et al. | |
| 5,351,952 | A | | 10/1994 | Hackman | |
| 5,372,365 | A | | 12/1994 | McTeigue et al. | |
| 5,441,256 | A | | 8/1995 | Hackman | |
| 5,478,073 | A | | 12/1995 | Hackman | |
| 5,509,809 | A | | 4/1996 | Clay | |
| 5,511,789 | A | | 4/1996 | Nakamura | |
| 5,588,919 | A | | 12/1996 | Nakamura | |
| 5,591,091 | A | * | 1/1997 | Hackman | 473/289 |
| 5,592,401 | A | | 1/1997 | Kramer | |
| 5,607,361 | A | * | 3/1997 | Mastandrea et al. | 473/207 |
| 5,609,534 | A | | 3/1997 | Gebhardt et al. | |
| 5,616,832 | A | | 4/1997 | Nauck | |
| 5,638,300 | A | | 6/1997 | Johnson | |
| 5,688,183 | A | | 11/1997 | Sabatino et al. | |
| 5,694,340 | A | | 12/1997 | Kim | |
| 5,772,522 | A | | 6/1998 | Nesbit et al. | |
| 5,791,351 | A | | 8/1998 | Curchod | |
| 5,821,417 | A | * | 10/1998 | Naruo et al. | 73/491 |
| 5,826,578 | A | | 10/1998 | Curchod | |
| 5,864,960 | A | * | 2/1999 | DeNicolo et al. | 33/508 |
| 5,879,241 | A | * | 3/1999 | Cook et al. | 473/289 |
| 5,879,246 | A | | 3/1999 | Gebhardt et al. | |
| 5,904,484 | A | | 5/1999 | Burns | |
| 5,907,819 | A | | 5/1999 | Johnson | |
| 5,911,636 | A | * | 6/1999 | Schmoll | 473/266 |
| 5,930,741 | A | | 7/1999 | Kramer | |
| 5,935,014 | A | | 8/1999 | Lindsay | |
| 5,951,410 | A | * | 9/1999 | Butler et al. | 473/223 |
| 5,976,022 | A | | 11/1999 | Williams | |
| 5,984,798 | A | | 11/1999 | Gilmour | |
| 6,000,286 | A | * | 12/1999 | Naruo et al. | 73/491 |
| 6,003,368 | A | | 12/1999 | Naruo et al. | |
| 6,014,887 | A | | 1/2000 | Naruo et al. | |
| 6,032,530 | A | | 3/2000 | Hock | |
| 6,041,651 | A | | 3/2000 | Naruo et al. | |
| 6,059,576 | A | | 5/2000 | Brann | |
| 6,083,123 | A | * | 7/2000 | Wood | 473/409 |
| 6,086,487 | A | | 7/2000 | Morgan et al. | |
| 6,120,384 | A | * | 9/2000 | Drake | 473/248 |
| 6,192,323 | B1 | | 2/2001 | Boehm | |
| 6,213,888 | B1 | * | 4/2001 | Kawaguchi et al. | 473/223 |
| 6,328,660 | B1 | | 12/2001 | Bunn, III | |
| 6,441,745 | B1 | * | 8/2002 | Gates | 340/669 |
| 6,537,076 | B2 | | 3/2003 | McNitt et al. | |
| 6,607,450 | B1 | * | 8/2003 | Hackman | 473/223 |
| 6,638,175 | B2 | * | 10/2003 | Lee et al. | 473/223 |
| 6,658,371 | B2 | | 12/2003 | Boehm et al. | |
| 6,702,692 | B1 | * | 3/2004 | Smith | 473/289 |
| 6,719,648 | B1 | * | 4/2004 | Smith | 473/409 |
| 6,966,843 | B2 | * | 11/2005 | Rankin et al. | 473/202 |
| 7,041,014 | B2 | * | 5/2006 | Wright et al. | 473/409 |
| 2001/0005820 | A1 | | 6/2001 | Boehm | |
| 2001/0007835 | A1 | * | 7/2001 | Baron | 473/305 |
| 2002/0077189 | A1 | * | 6/2002 | Tuer et al. | 473/151 |
| 2002/0119828 | A1 | | 8/2002 | Toulon et al. | |
| 2003/0008731 | A1 | * | 1/2003 | Anderson et al. | 473/407 |
| 2004/0204262 | A1 | * | 10/2004 | White et al. | 473/287 |
| 2005/0277483 | A1 | * | 12/2005 | Peterson et al. | 473/282 |

FOREIGN PATENT DOCUMENTS

| | | |
|---|---|---|
| WO | WO 00/41776 | 7/2000 |
| WO | WO 00/71212 A1 | 11/2000 |
| WO | WO 01/28644 | 4/2001 |

OTHER PUBLICATIONS

Notice of Allowance from the United States Patent & Trademark Office in co-pending U.S. Appl. No. 13/027,201 dated Apr. 8, 2013.
Jon Hastings, "Swing into the Future", Reprinted from California Golf.
"The Golf Works," Full Line Catalog, 1991, Section 7, p. 7-1.
B. Le Fichous, et al. P. Swider, "Dynamics of the Swing of a Golfer", Laboratorire de Mecanique Des Structures, May 28, 1997, pp. 1-41.
"Sportech", Swing Analyzer, 6 pages.
"Swingcam", 2001, 1 page.
"Callaway, IBM link up on high-tech golf cart," Golfweek.com, Jun. 2001, 3 pages.
"GolfTek," Pro III Series, 4 pages.

* cited by examiner

SPEED OF A GOLFER'S HAND DURING A GOLF SWING

THE OVAL REPRESENTS THE AREA COVERED BY THE GROUP.
THE GROUPS ARE LABELED BY NUMBER FOLLOWED BY THEIR PREFERRED CLUB STYLES.

METHOD FOR MATCHING A GOLFER WITH A PARTICULAR CLUB STYLE

Matter enclosed in heavy brackets [ ] appears in the original patent but forms no part of this reissue specification; matter printed in italics indicates the additions made by reissue.

BACKGROUND OF THE INVENTION

This application is [a] *in* continuation of prior application Ser. No. 10/116,688, filed Apr. 3, 2002, now U.S. Pat. No. 7,041,014, which claims [priority from] *the benefit of* U.S. Provisional Application Ser. No. [60/281,950] *60/281,850* filed [Apr. 6, 2001] *Apr. 5, 2001*.

FIELD OF THE INVENTION

The present invention relates to a method for matching a golfer with a particular style of golf club.

DESCRIPTION OF THE RELATED ART

A golf club typically includes three basic structural components: a shaft, golf club head, and a grip. The shaft is typically hollow and made of a carbon fiber-type composite material. The golf club head is attached to the lower end of the shaft and is used to strike a golf ball. The grip typically covers the upper end of the shaft and is used to facilitate gripping by the golfer.

Golf clubs come in a myriad of styles or types. That is, the performance characteristics of three basic structural components can each be varied in several ways. For example, the flexibility and total weight of the golf club shaft can be varied. The distribution of weight along the axis of the shaft also can be varied.

Given the multitude of golf club styles, it can be difficult for a golfer to select a golf club that properly matches his or her golf swing. Typically, the golfer selects a golf club by testing as many different styles of golf clubs as possible and making the selection based upon the feel and/or performance of the clubs tested. In addition, or in the alternative, the golfer may seek the advice of an expert. The expert typically uses his or her prior experience in matching golfers with golf clubs, to select the proper golf club for the golfer.

These traditional methods for matching a golf club to a golfer have several disadvantages. For example, these methods are highly subjective and typically do not yield accurate or repeatable results. Moreover, these methods typically are limited to selecting between golf clubs that are available for testing. A need, therefore, exists for an improved method for matching a golfer to a type of golf club.

U.S. Pat. No. 6,083,123 purports to disclose an improved method for fitting golf clubs to golfers. The method includes measuring specific objective parameters of a golfer's golf swing. These parameters relate to: (i) the movement of the golf club during a golf swing (e.g., club head speed, the time it takes for the club head to travel from the address position to the point of impact with a golf ball), (ii) the resulting golf shot (e.g., the launch conditions of the golf ball and the trajectory of the golf ball), and (iii) the golfer's physical characteristics (e.g., the golfer's height). The patent states that inferences are made from these parameters to "specify a theoretically ideal golf club matching a test golfer's personal swing characteristics." However, the patent fails to provide any details concerning how these inferences are made. Accordingly, the patent fails to provide sufficient information to enable the golfer to be matched to the optimal golf club.

SUMMARY OF THE INVENTION

During the downswing of a typical golf swing, the hands of the golfer revolve around the golfer and the golf club head rotates about the moving hands as the golfer's wrists uncock. These two movements occur together and bring the club head into contact with the golf ball. During this movement, the golf club is accelerated to high linear and angular velocities by the forces and moments exerted by the golfer's hands at the handle of the golf club. The mechanical properties of the golf club, including, e.g., shaft flex, weight, and weight distribution, influence how the movements of the golfer's hands and the forces and moments exerted by the golfer's hands translate into movements of the golf club. To maximize the performance of the golf club, the properties of the golf club must be suitable for the movement of the golf club.

It is generally desirable in a golf swing to maximize the speed of the club head at impact. The mechanical properties of the club, e.g., the shaft flex, weight, and weight distribution, can influence the golfer's ability to achieve high club head speed. Accordingly, for a given movement pattern of the golfer's hands, there will be a set of shaft properties that is optimal for maximizing head speed at impact.

However, each golfer has a different golf swing and golfers generally do not swing their golf clubs in the same way. For example, the hand movement patterns during a golfer's golf swing differs from golfer to golfer. It is for this reason that different golfers prefer and perform best with golf clubs having different mechanical properties, i.e., different golf club types or styles.

For example, it is recognized that just prior to impact of the club head with the ball, some golfers have relatively low hand speed, but high angular velocity of the golf club. For this type of golfer, the golf club can be thought to be swinging about the wrist joints, and the golf club may most easily be accelerated to high club head speeds if the center of gravity of the shaft is located away from the hands of the golfer and the shaft has a lower moment of inertia. Other types of golfers have relatively high hand speeds and a lower angular velocity of the golf club. For this type of golfer, the golf club can be thought of as swinging around the center of the golfer's body, and the golf club may most easily be accelerated to high club head speeds if the center of gravity of the shaft is located closer to the hands. By carefully measuring the speed of the hands and the rate of rotation of the golf club about the hands just before impact, the golfer can be classified as one of the two above-described types of golfers. Once the golfer has been classified, it can be recommended the golfer use a club type having a weight distribution that most suitably corresponds to the golfer's swing type.

Accordingly, one aspect of the present invention is the recognition that a golfer's golf swing can be classified into groups based upon performance parameters, which are, at least in part, derived from certain objective measurements of a golfer's golf swing. Moreover, it is recognized that golfers with the same swing type generally prefer the same style or type of golf club and that golfers with different swing types generally prefer different types or styles of golf clubs. Thus, by classifying a golfer's swing type, a golfer can be properly matched to a particular type or style of golf club.

Another aspect of the present invention involves a method for matching a golfer to a golf club. The method includes having a golfer swing a golf club while the golf swing is measured to determine certain performance parameters. The golfer's swing is classified into a swing type based upon these performance parameters. A style of golf club is selected from a plurality of styles of golf clubs based upon the swing type of the golfer's golf swing.

Yet another aspect of the present invention is that the performance parameters include and/or are derived from certain unexpected objective measurements. Specifically, it has been determined that certain measurements of the golfer's motion are particularly useful for classifying the golfer's golf swing. These measurements include measurements of the three-dimensional spatial movement of the golfer's hands. These measurements of three-dimensional movements of parts of the golfer and club preferably include position, velocity, and/or acceleration. These quantities can be measured continuously versus time during the golf swing and/or these quantities can be measured at only certain steps or phases of the golf swing, e.g., at the time the swing changes direction at the top of the golf swing or at the time of impact with the golf ball. These measurements can be used individually or they can be used in combination. For example, positions and velocity from two different phases of the golf swing can be used together.

An exemplary system for obtaining the aforementioned measurements is a three-dimensional motion analysis system, which preferably includes a micro-electro-mechanical system (MEMS) incorporating accelerometers and rate gyros. Sensors are also provided for obtaining angle and orientation measurements to provide data in six degrees-of-freedom, which can be used to derive the measurements for the performance parameters. In a modified arrangement, an optically-based motion analysis system may be used to obtain the measurements for the performance parameters. In yet another modified arrangement, a golf club having suitable instrumentation incorporated therein may be used to gather the measurements for the performance parameters.

Two examples of performance parameters that are related to measurements of the golfer's hand motion are the Minimum Hand Speed at Change of Direction, which is defined as the minimum speed of the golfer's hand during the change of direction or transition to the downswing, and the Time of Peak Hand speed, which is defined as the time from the start of the golfer's downswing to the time of peak hand speed. Other performance parameters relating to other parts of the swing also can be used.

Still another aspect of the present invention is a method for further improving the match between a golf club and a golfer's swing type. The method includes performing an initial cluster analysis of various objective measurements of golfers' golf swings so as to correlate basic performance parameters with basic swing types and golf club preferences. After the initial classifications have been made, the initial classifications are further analyzed so as to correlate more specific performance parameters and with more specific swing types and golf club preferences, such as, for example, shaft flex, and weight.

Other features and advantages of the present invention should become apparent to those skilled in the art from the following detailed description of the preferred methods, having reference to the accompanying drawings, which illustrate the principles of the invention.

BRIEF DESCRIPTION OF THE DRAWINGS

These and other features of the invention will now be described with reference to the drawings of the preferred embodiments, which are intended to illustrate and not to limit the invention, and in which.

DETAILED DESCRIPTION OF THE PREFERRED METHODS

Figure 1:
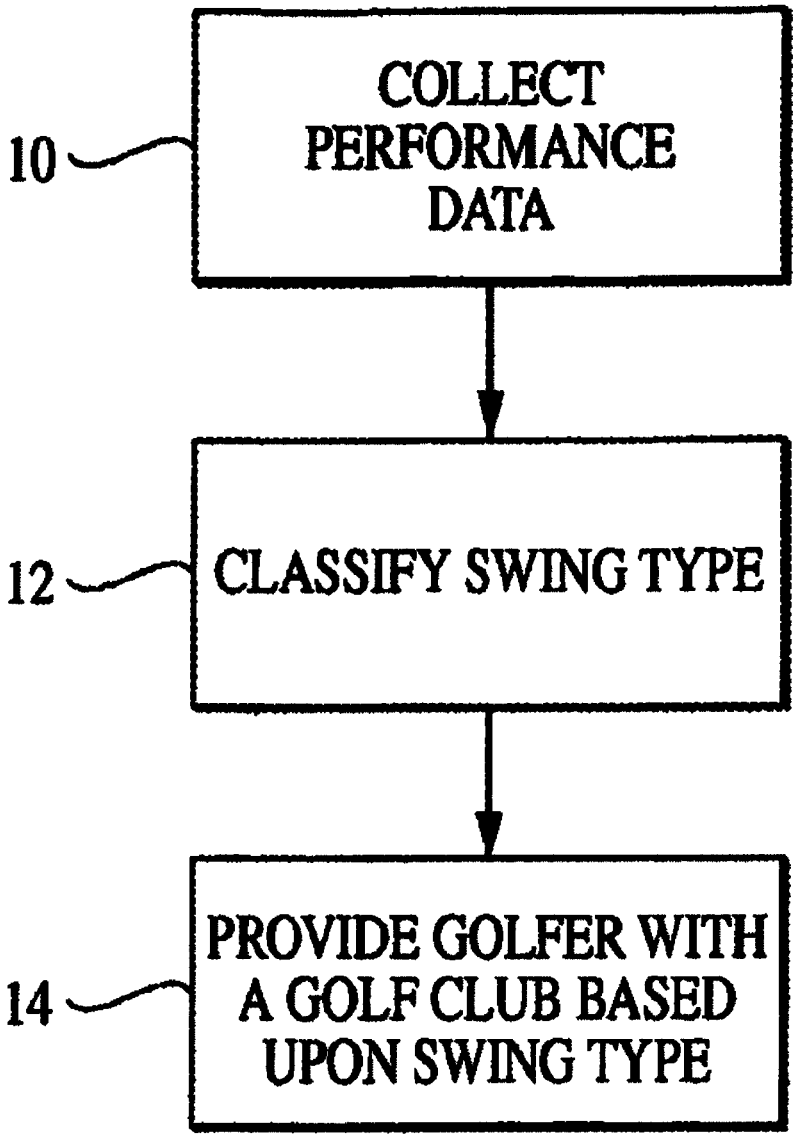
FIG. 1 is a flowchart of a method for matching a golfer to a golf club that has certain features and advantages according to the present invention.

The present invention relates generally to methods for matching a golfer with an optimal golf club selected from a group of golf clubs having distinct physical characteristics or styles. Specifically, with reference to FIG. 1, certain "performance parameters" of a golfer's golf swing are collected (operational block 10) by, at least in part, taking certain objective measurements of a golfer's golf swing. These performance parameters are used to classify the golfer's swing into a swing type, as represented by operational block 12. The golfer then is provided with a golf club based upon the golfer's swing type (operational block 14). Preferably, the loft and lie of the selected golf club are also adjusted to achieve the desired trajectory. One of the advantages of the present invention is that the performance parameters are based upon objective data. Therefore, as compared to prior art methods which rely upon the subjective observations of the golfer or an expert, the present invention more In developing the present invention, it was hypothesized that golfers having different types of golf swings require different types or styles of golf clubs. It also was hypothesized that golf swings could be classified into groups or classifications, in which golfers within the same group generally prefer the same style of golf club and golfers in different groups generally prefer different styles of golf clubs. Moreover, it was believed that these groups could be identified and defined by certain objective measurements of a golfer's golf swing (i.e., performance parameters). Desirably, each performance parameter for a given group defines a specified range.

Figure 6:
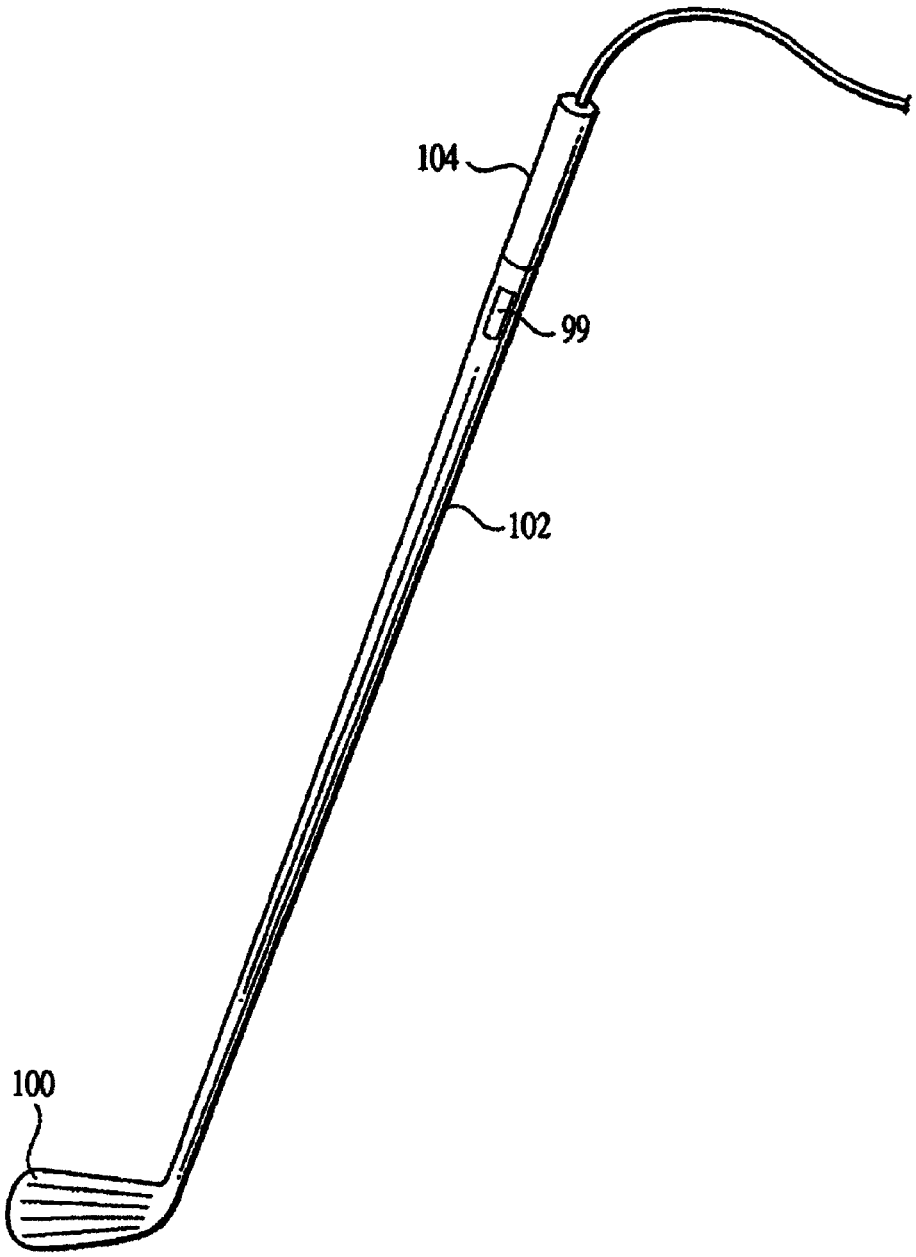
FIG. 6 is an example of an instrumented golf club for measuring shaft deflection, for example.

To test this hypothesis and to identify the performance parameters useful in classifying a golfer's swing, more than 100 performance parameters were measured for the golf swings of more than 150 golfers using: (i) three-dimensional motion analysis for measuring the motion of the golf club and the golfer during a golf swing, and (ii) discrete measurements taken from devices mounted on the golf club, e.g., one or more strain gauges 99 (see FIG. 6) positioned on a golf club shaft 102, for measuring shaft flex.

To determine what style of golf club the tested golfers prefer, most of the tested golfers tested several different styles of golf clubs. That is, the golfers were provided with golf clubs having substantially identical structural configurations, but different specific mechanical properties or performance characteristics, e.g., different shaft weighting configurations and/or different shaft flexibilities. The golfers' preferences as to styles of golf clubs were also recorded.

Figure 2:
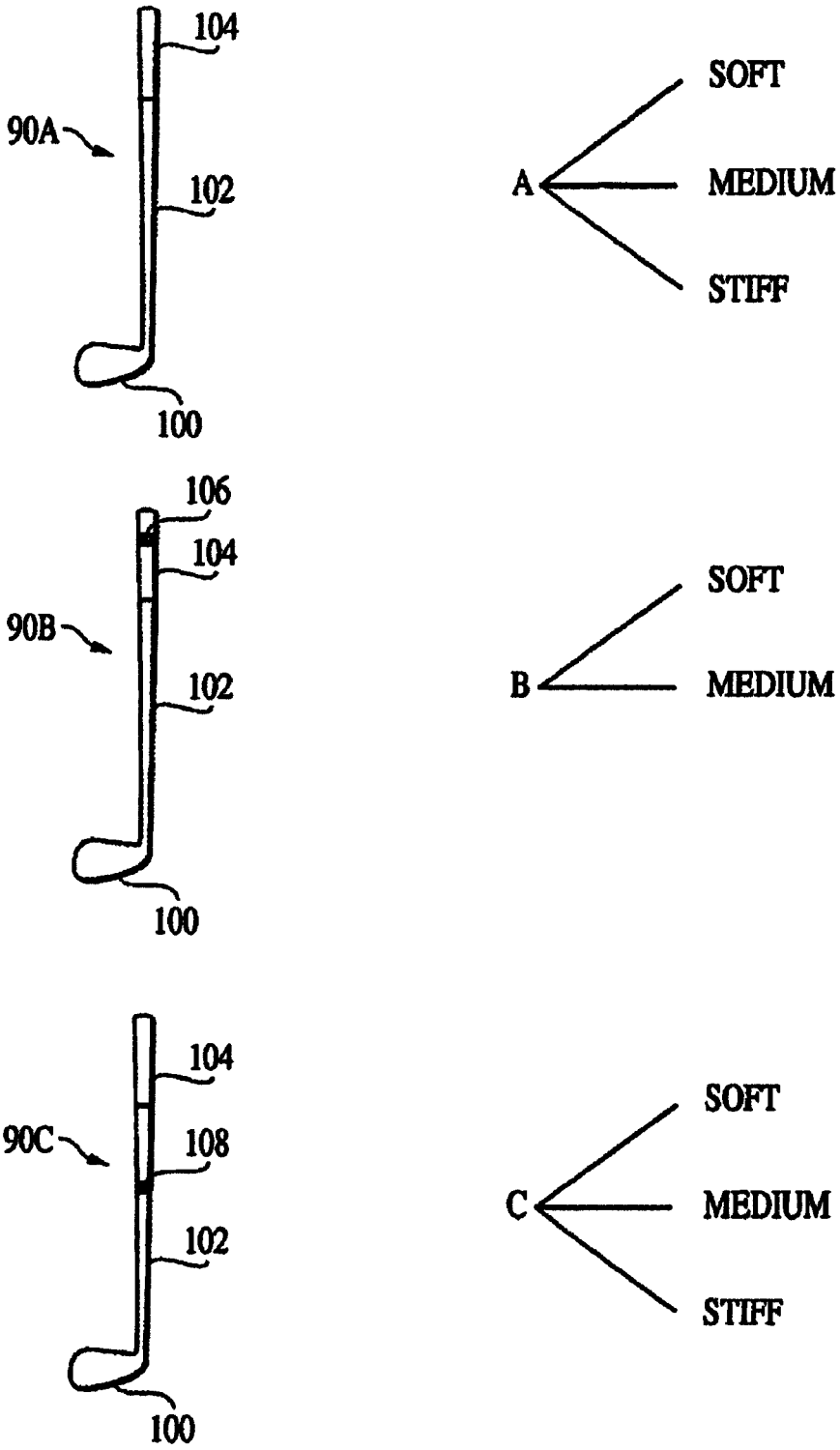
FIG. 2 is a schematic representation of eight styles of golf clubs.

More specifically, each golfer was provided with up to the eight different styles of golf clubs, illustrated in FIG. 2. The eight styles could be divided into three divisions, labeled A, B, and C. Each of the golf clubs 90A, 90B, and 90C in the three divisions had substantially the same structural configuration. That is, each club has a golf club head 100, a shaft 102, and a grip 104. However, each division has a distinct set of performance characteristics (i.e., mechanical properties).

More particularly, each of the three divisions had a different shaft weighting configuration. That is, the shaft 102 varied with respect to: (i) the total weight of the shaft, and (ii) the distribution of weight along the length of the shaft. Specifically, the golf clubs in division A were characterized by a lightweight shaft having a mass of about 50-65 grams. The golf clubs in division B were characterized by a conventional-weight shaft having a mass of about 70-115 grams, and also by having about 15 grams of performance weight 106 added to their handles 104. The golf clubs in division C were characterized by shafts having a mass of about 70-95 grams, and also by having about 30 grams of performance weight 108 added to about the mid-point of the shaft 102.

Each of the golf club style divisions A, B, and C further could be divided by shaft flexibility. For example, the shafts of the golf clubs in division A were provided with three different flexibilities: soft (i.e., having a frequency of about 235 cycles per minute), medium (i.e., having a frequency of about 255 cycles per minute), and stiff (i.e., having a frequency of about 275 cycles per minute). In a similar manner, divisions B and C also could be subdivided into subdivisions based upon the flexibility of the shaft 102, as shown in FIG. 2.

A database was developed that includes more than 100 objective performance parameters of the golf swings of 75 golfers. The database also included the golfer's club preference for a particular style of golf club. A statistical "cluster" analysis was performed on this database, to determine which performance parameters, or combination of performance parameters, best predict what club style a particular golfer would prefer. More specifically, the golfers were classified into groups defined by a set of performance parameters.

The groups are characterized in that golfers within a group generally prefer the same style of golf club and golfers in different groups generally prefer different styles of golf clubs. Preferably, the groups are defined by fewer than ten performance parameters so as to reduce the complexity of the classifying of a golfer's swing. More preferably, the groups are defined by fewer than six parameters. Most preferably, the groups are defined by fewer than five parameters. The number of groups also is limited by practical considerations. For example, using too many groups would increase the complexity of the matching a golfer to a club style.

Surprisingly, performance parameters involving measurements of the golfer's hand motions during his or her golf swing have been determined to be particularly important in identifying a golfer's swing type and in identifying the golf club style preferred by the golfer. During the cluster analysis, groups of similar data points were identified, and each data point was capable of belonging to more than one group. In one example, shown in Tables I and II, seven groups were utilized with seven club types. Four performance parameters were utilized in this model, including: (1) Impact Club Head Speed, (2) Maximum Shaft Deflection, (3) Time of Peak Hand Speed, and (4) Minimum Hand Speed.

Figure 3:
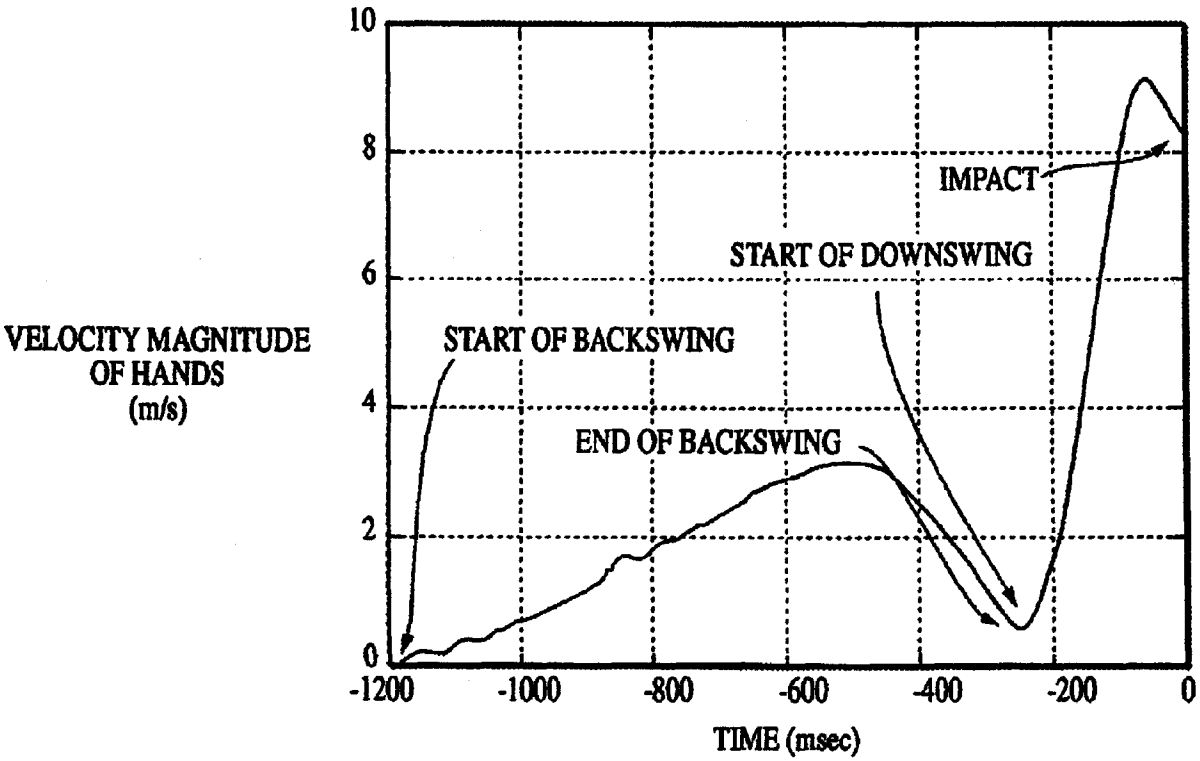
FIG. 3 is a plot of the velocity of a golfer's hands versus time during a golf swing.

Impact Club Head Speed is the speed of the club head at the time of impact with the golf ball. Maximum Shaft Deflection is the total, maximum movement of the club head in the swing-plane and droop-plane axes, relative to a shaft coordinate system fixed at the golf club's grip. Time of Peak Hand Speed is the time duration from the start of the golfer's downswing to the time of peak hand speed (see FIG. 3). Minimum Hand Speed is the minimum speed of the golfer's hands during the change of direction/transition from the backswing to the downswing.

Using these performance parameters, the golfer's golf swing is preferably classified into seven groups, which are defined in Table I below.

TABLE I

| | Group 1 | Group 2 | Group 3 | Group 4 | Group 5 | Group 6 | Group 7 |
|---|---|---|---|---|---|---|---|
| Club Head Speed (mph) | 93-103 | 100-117 | 102-117 | 87-105 | >109 | 107-109 | 87-93 |
| Max. Shaft Deflection (mm) | 85-105 | 100-130 | 100-104 | 84-125 | >160 | 144-154 | 125-140 |
| Time of Peak Hand Speed (sec.) | .22-26 | .175-22 | .185-.25 | .3-.38 | .15-24 | .17-21 | .26-.28 |
| Min. Speed of Hands @ COD (mm/sec.) | 200-300 | 300-650 | 70-280 | 86-330 | 17-150 | >500 | 40-150 |

Golfers within each of the seven groups identified above generally prefer the same style of golf clubs. Golfers within different groups generally prefer different types of golf clubs. With respect to seven groups and the golf club styles illustrated in FIG. 2, the following relationships between the groups and club style preference has been determined:

TABLE II

| Swing Classification | Shaft Weighting Preference | Shaft Flexibility Preference |
|---|---|---|
| Group 1 | Division A or C | Medium |
| Group 2 | Division B | Medium, some Stiff |
| Group 3 | Division B | Stiff |
| Group 4 | Division A | Soft, some Medium |
| Group 5 | Division B | Stiff |
| Group 6 | Division B | Medium and Stiff |
| Group 7 | Division C | Soft |

Another aspect of the invention involves a cluster analysis, in which the forming of groups or clustering is performed independently on different aspects of the golf club, e.g., club weight, flex, kick point, torque, etc. Accordingly, a cluster model is obtained for correlation with a family of golf clubs. The cluster model comprises two or more groups, each group comprising certain performance parameter values, utilized in conjunction with two or more golf club types.

Another example of the invention uses a cluster model for golf club family correlation having three groups and three golf club types. The performance parameters used in this model include: (1) Impact Club Head Speed, (2) Relative Time of Theta-1 Peak Acceleration, and (3) Theta-1 Excursion During the Golfer's Swing.

Figure 7:
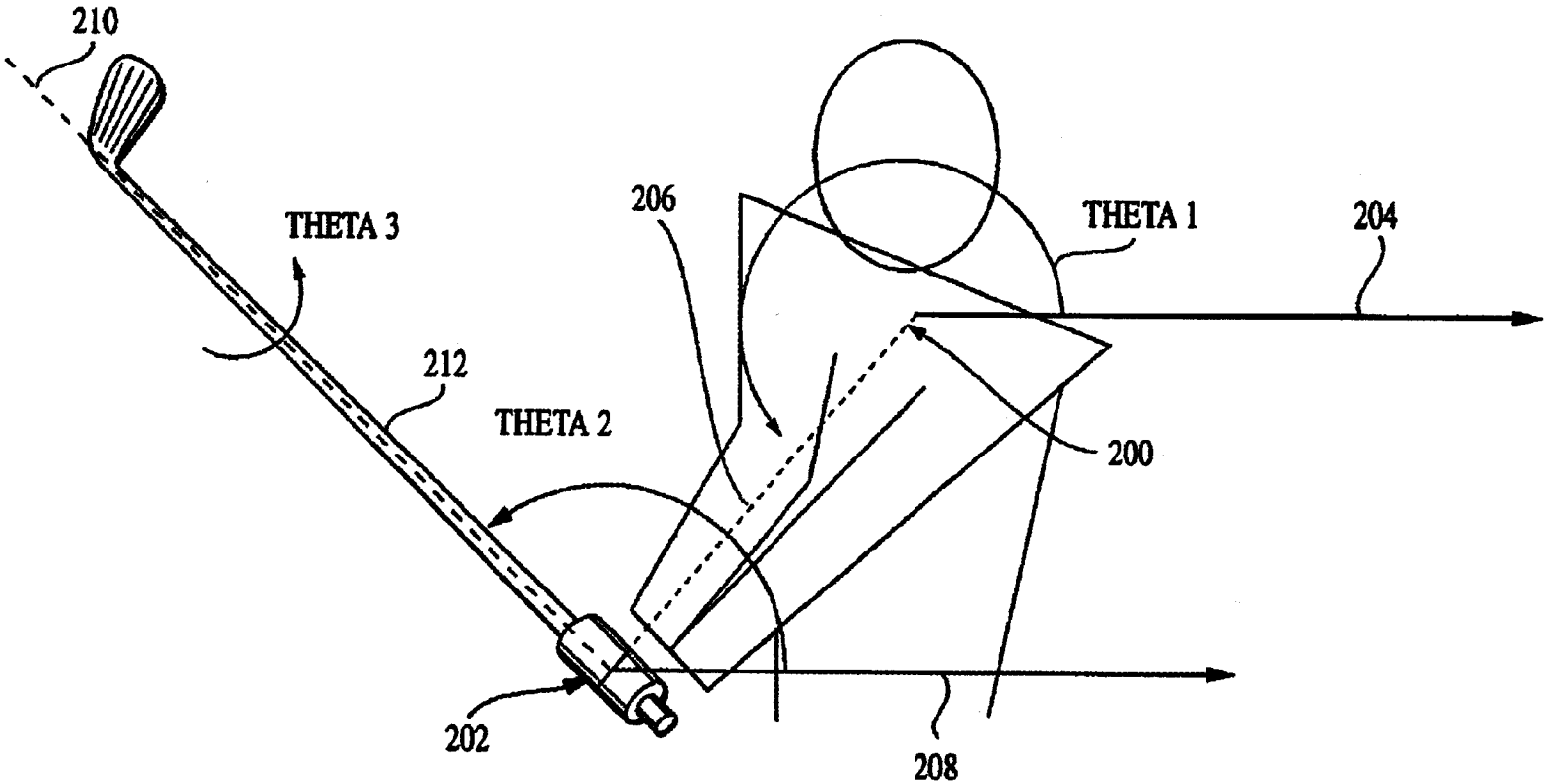
FIG. 7 is a schematic illustration of a golfer swinging a golf club.

With reference to FIG. 7, Theta-1 is an angle measured in the swing plane (i.e., the plane swept out by the golf club), between (1) a horizontal line 204 extending toward the target from a point 200 at the center of an ellipse traced by a point 202 at the middle of the hands during the swing and (2) a line extending from the point 200 to the point 202 at the middle of the hands. Relative Time of Theta-1 Peak Acceleration is the time from the start of the golfer's downswing to the time of peak acceleration of Theta-1. This parameter is associated with the acceleration of the golfer's hands. Finally, Theta-1 Excursion is the difference between Theta-1 at the top of the backswing and Theta-1 at impact. Theta-1 Excursion represents the amplitude of the revolution of the hands about the center of the golfer's body during the downswing movement, and it is associated with the golfer's hand position during the golf swing.

Using these performance parameters, the golfer's golf swing is preferably classified into three groups, which are defined in Table III below.

TABLE III

| Swing Classification | Shaft Weight Preference | Impact Club Head Speed | Relative Time of Theta-1 Peak Accel. | Theta-1 Exclusion During Swing |
|---|---|---|---|---|
| Group I | Division A | low | late | low |
| Group II | Division B | high | early | moderate |
| Group III | Division C | moderate | moderate | high |

A further example of the invention for shaft flex correlation to swing type again includes three groups and three club types. In this example, the parameters of interest include: 1) Relative Time of (Theta-1 Theta-2) Peak Acceleration, 2) Slope of Theta-3 versus Theta-2-Theta-1 at impact, and 3) Total Deflection at Peak Droop Deflection. As with Theta-1, Theta-2 is measured in the swing plane. Theta-2 is defined as the angle between the axis 210 of the golf club shaft 212 and a horizontal line 208 extending to the target from the point 202 at the middle of the golfer's hands.

Theta-3 is defined as the angle of club rotation about the axis 210 of the shaft 212. A Theta-3 value of zero represents a square club face (i.e., a line normal to the club face is generally parallel to the direction of travel of the club face during the swing). A positive Theta-3 value represents an open club face (i.e., a line normal to the club face points to the right of the direction of travel of the club face during the downswing). As such, Theta-3 is a measure of the openness of the club face relative to the swing plane.

Relative Time of Theta-1 -Theta-2 Peak Acceleration is the time from the start of the golfer's downswing to the time of peak acceleration of Theta-2 minus Theta-1. This parameter is associated with the uncocking of the golfer's hands. The slope of Theta-3 versus Theta-2-Theta-1 at Impact is the ratio of the rate of change of Theta-3, which is indicative of the rate of club face closure, to the rate of change of Theta-2-Theta-1, which is indicative with the wrist cock angle (i.e., the angle between the axis 210 of the shaft 212 and the line 206 joining the center of the ellipse with the point 202 at the middle of the hands). This parameter is related to the timing and magnitude of wrist uncocking and hand rotation. Total Deflection at Peak Droop Deflection is the total movement of the club head in the swing-plane and droop-plane axes, relative to a shaft coordinate system fixed at the golf club's grip when the total movement of the club head in the droop-plane axis reaches a maximum.

Using these performance parameters, the golfer's golf swing is preferably classified into three groups, which are defined in Table IV below.

TABLE IV

| Swing Classification | Shaft Flexibility Preference | Relative Time of Theta-1-Theta-2 Peak Acceleration | Slope of Theta-3 vs. Theta-2-Theta-1 at Impact | Total Deflection at Peak Droop Deflection |
|---|---|---|---|---|
| Group A | soft | late | high | moderate |
| Group B | medium | medium | medium | high |
| Group C | stiff | early | low | moderate |

Using the groups such as described in the above examples, a golfer can be matched to an appropriate style of golf club. Specifically, the performance parameters of a golfer's swing are first measured. The performance parameters are then used to classify the golfer's swing into one of the groups described above. The golfer is then provided with a golf club based on the group to which the golfer belongs. Preferably, the loft and lie of the selected golf club also are selected adjusted to achieve the desired shot shape and trajectory. Note, that with respect to some swing types, golfers may prefer more than one type of club style. For example, as shown in Table II, golfers in Group 2 tend to prefer a golf club with a weighting configuration of division B with a shaft flexibility of Medium. Accordingly, a golfer can be provided with a Soft and Medium golf club from division B. The golfer can then test both golf club styles to determine the best fit.

Figure 5:
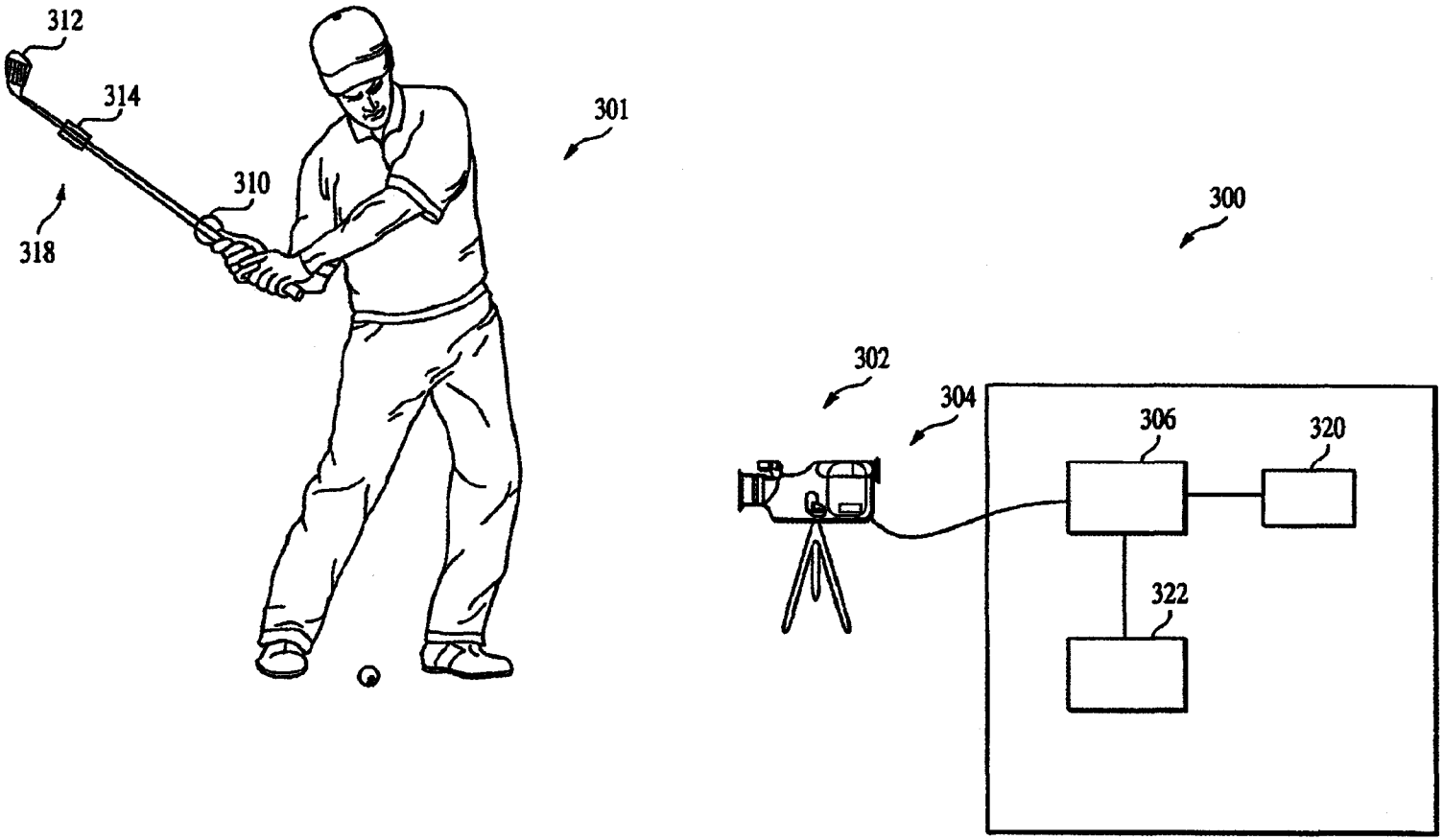
FIG. 5 is a schematic illustration of an apparatus that is used to match a golfer to a golf club and has certain features and advantages according to the present invention.

FIG. 5 illustrates an arrangement of a golf club matching system 300 that can be used to match a golfer 301 to a golf club pursuant to the method and techniques of the examples described above. Specifically, the golf club matching system can use the performance parameters and groups described above to match a golfer to a style of golf club.

As shown in FIG. 5, the club matching system 300 includes a performance parameter collection system 302 for collecting performance data from the golfer's swing. This collection system includes a three-dimensional optical motion analysis system 304, such as is available from Qualisys, Inc. The motion analysis system is electronically connected to a processor 306, which is configured to analyze many aspects of the collected data. Specifically, the processor is configured to record the motion of a golfer's hands 310 as a function of time during a golf swing and also to record the motion of the club head 312 during the golf swing.

In one preferred form, a dual camera system is used. Specifically, a first camera system includes seven cameras for capturing the entire golf swing. These seven cameras operate at 240 frames/second capability, and they view a 3×3×3 meter volume. Further, a second camera system includes three cameras for capturing the golf swing. These three cameras operate at 1000 frames/second, and they capture a shoe-box sized volume at about the location of the club head just prior to the impact with the golf ball.

Figure 4:
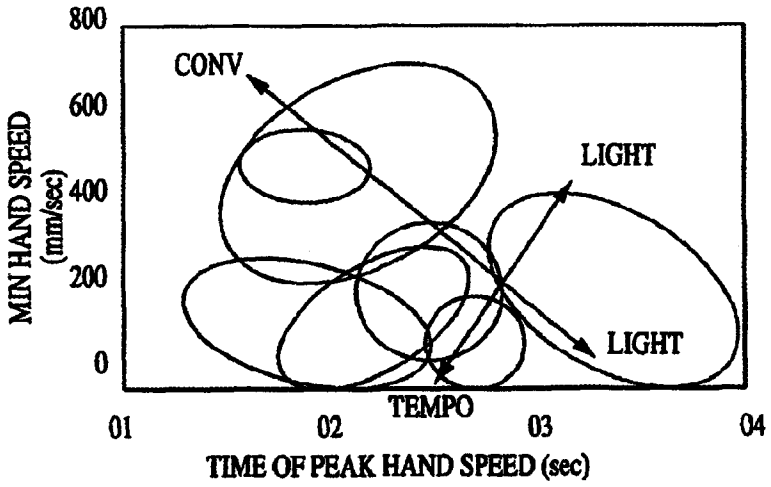
FIG. 4 is an example of groups in a cluster analysis.
Figure 4:
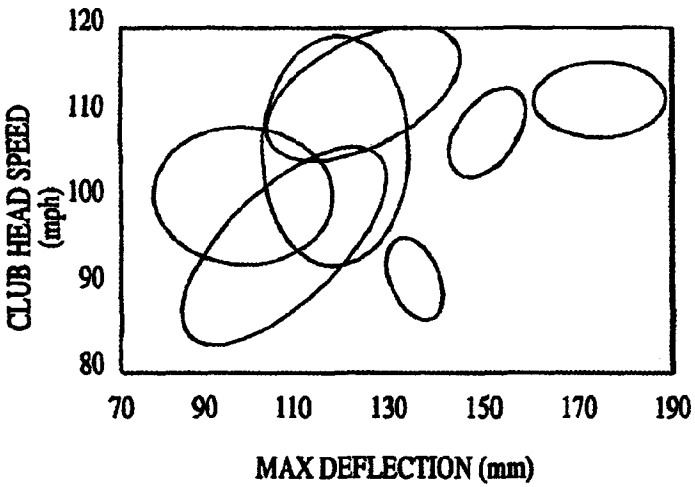

Accordingly, from the data collected by the three-dimensional motion analysis system 302, the processor 306 can generate a plot of the velocity of the player's hands 310 versus time. An example of such a plot is provided in FIG. 3. Hand speed is measured at a point approximately 11 cm from the butt end of the club, along the longitudinal axis of the grip. From this plot, the processor 306 can generate certain performance parameters, as described above. The processor 306 and the three-dimensional motion analysis system 304 also are configured to generate plots such as of the velocity of the club head 312 as a function of time, and other performance parameters, examples of which are identified in FIG. 4.

In a modified arrangement, the three-dimensional motion analysis system may include measurement devices that do not require optical-based data processing. An example is the use of inertial measurements units in the form of rate gyros or the like, which are attached to a golfer and/or to the golf club. Reduction to desired performance parameter values of the data as provided in such a system is known to those skilled in the art. Preferably, one feature common to these three-dimensional motion analysis systems is a data sampling rate of at least 120 samples per second, and more preferably at a data sampling rate of at least 200 samples per second. Preferably, the accuracy in measuring the position of a golfer's body part along three axes is within about 5 millimeters at each successive sample. The accuracy in measuring each angle of interest preferably is within about 2 degrees. The accuracy in measuring a rotation velocity of each body part of interest preferably is within about 10 degrees/second, and more preferably within about 1.0 degrees/second.

Preferably, the performance parameter collection system 300 also includes a golf club data collector 314. The golf club data collector 314 is configured to collect data from one or more sensors located on the golf club 318. For example, the golf club can carry strain gauges, accelerometers, and/or magnetic sensors, for providing club head and/or shaft measurements. As with the three-dimensional analysis system, the golf club data collector is also preferably electronically connected to the processor 306.

The processor 306 preferably is connected to a memory storage device 320, which preferably stores relationships between the performance parameters and swing groups described above. The memory storage device preferably also stores the relationships between swing groups and club styles described in more detail above. The processor preferably is connected to an output device 322 for displaying the swing group of the golfer and/or the selected golf club style for the golfer. The output device 322 can comprise a computer screen 324, a printer 326, and/or an electronic disk.

Various procedures can be implemented for matching a golfer to be fitted with a particular golf club selected from a group of golf club styles. In one example, the selection is made from three different golf club styles, which differ from each other only in the flexibility of their shafts. These shaft flexes are identified as S (stiff), X (extra stiff), and XX (extra extra stiff). A separate swing style is associated with each of the three golf club styles.

In this example, five different performance parameters are used to characterize a golfer's swing style into one of three different styles. These performance parameters include: (1) rate of change of Theta-2 at the end of the downswing, (2) elevation angle of the backswing plane, (3) handicap, (4) peak-to-peak vertical movement of the mid-hands during the backswing, and (5) maximum shaft deflection. These five parameters are represented in FIGS. 8A-8E, which are graphs depicting the distribution of values for these five parameters exhibited by a large group of previously fitted golfers. Each such graph depicts a separate curve for those of the previously fitted golfers preferring each of the three shaft flex styles.

Figure 8A:
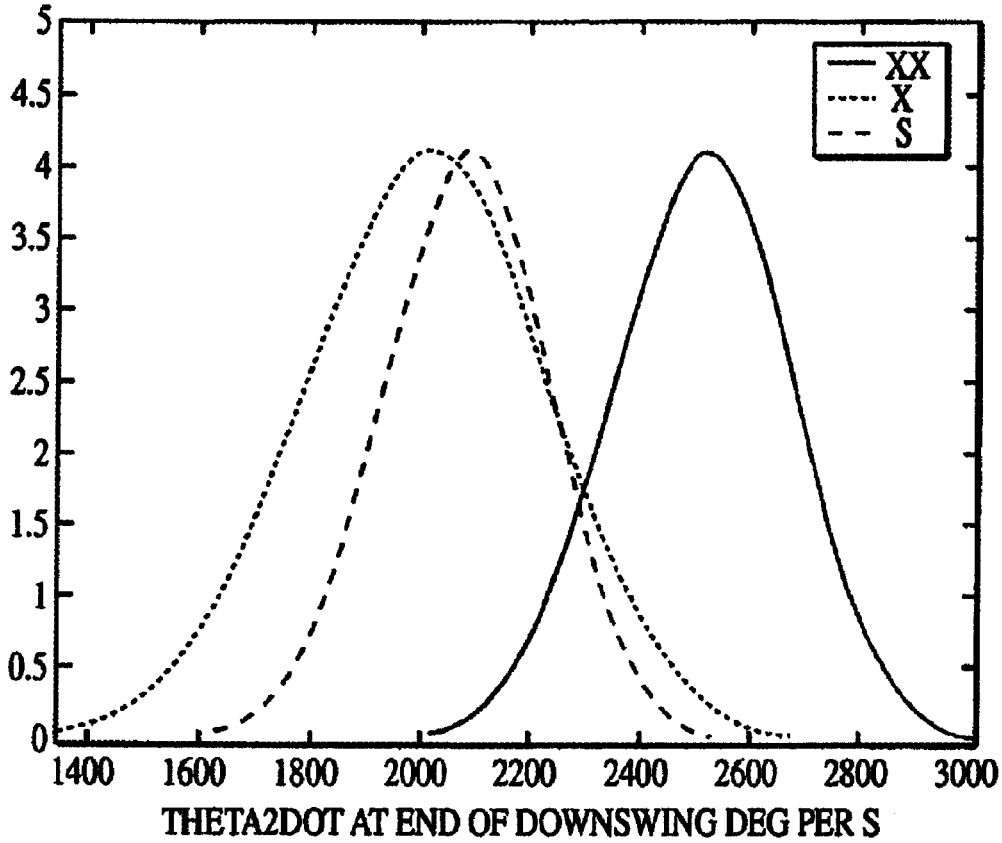
FIGS. 8A-8E are graphs depicting the distributions of a large number of previously fitted golfers for five different performance parameters that can be used to facilitate the proper matching of a golfer with a golf club selected from a group of golf clubs having different shaft flexes.
Figure 8B:
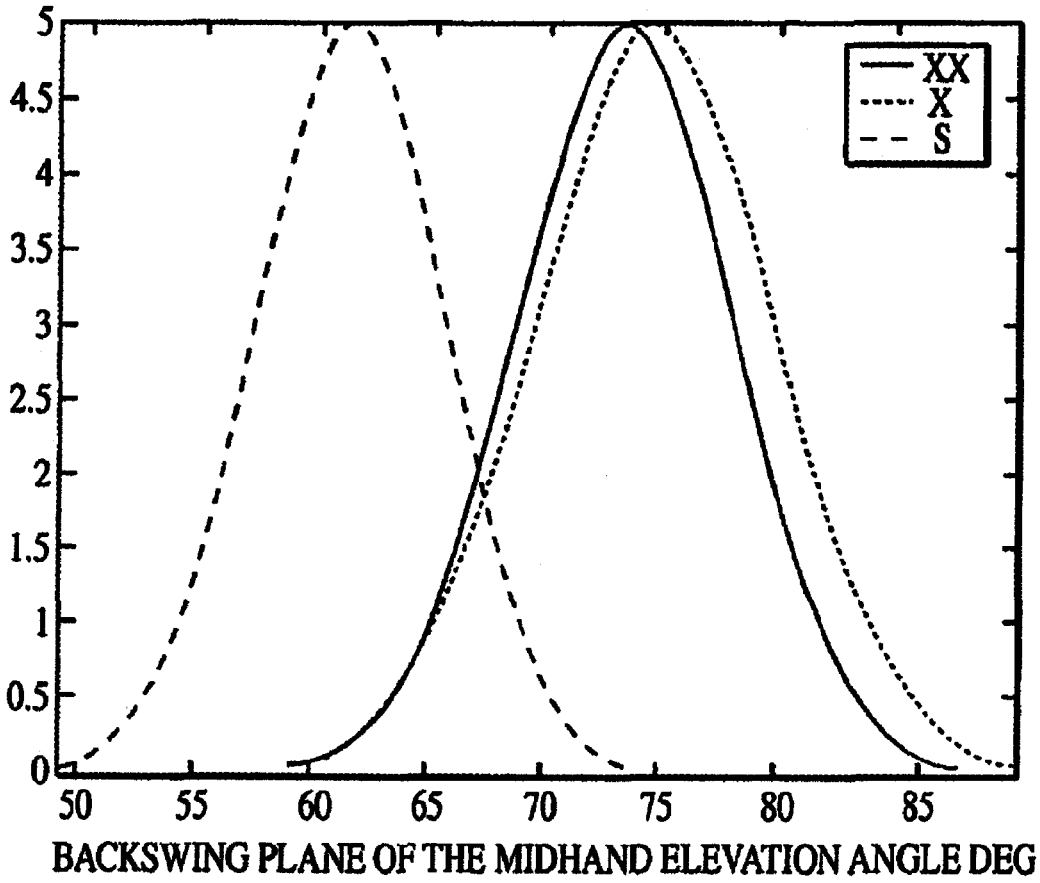

For example, FIG. 8A depicts the rate of change of Theta-2 at the end of the downswing, i.e., at the moment of impact with the golf ball. As mentioned above, Theta-2 is measured in the golfer's swing plane and is defined as the angle between the axis of the golf club shaft and an imaginary horizontal line extending to the target from a point at the middle of the golfer's hands. It will be noted in FIG. 8A that the previously fitted golfers who prefer a golf club having an X shaft flex generally exhibit a lower rate of change of Theta-2 than do the previously fitted golfers who prefer golf clubs having XX or S shaft flexes. The average of such fitted golfers preferring the X shaft flex have a rate of change of Theta-2 of about 2000 degrees per second.

Figure 8C:
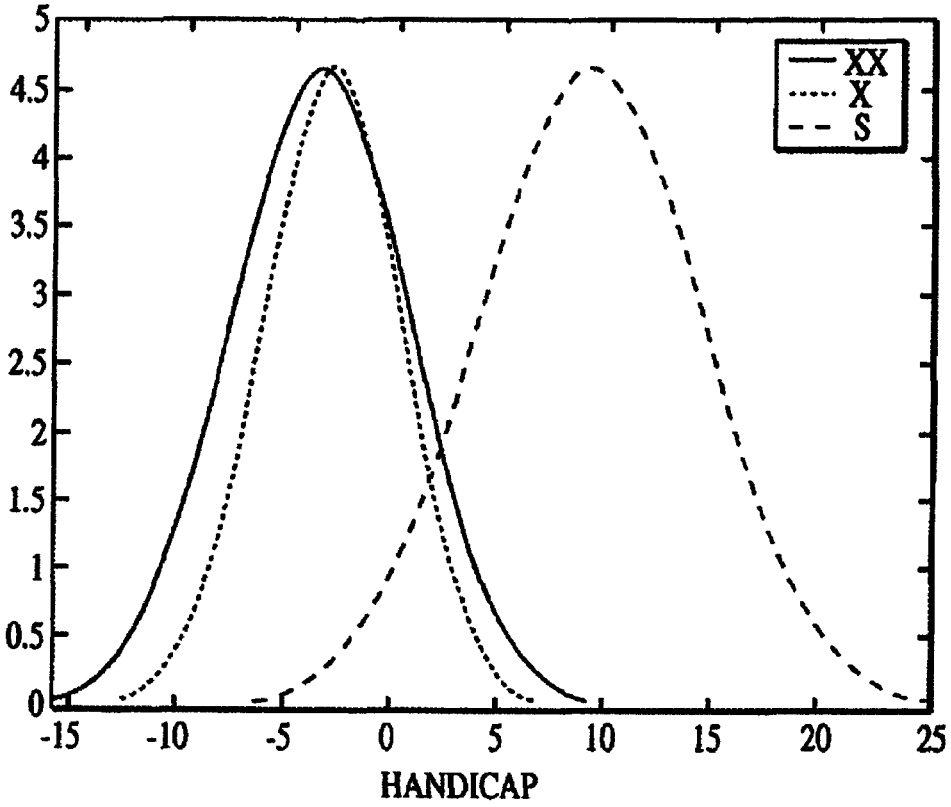
Figure 8D:
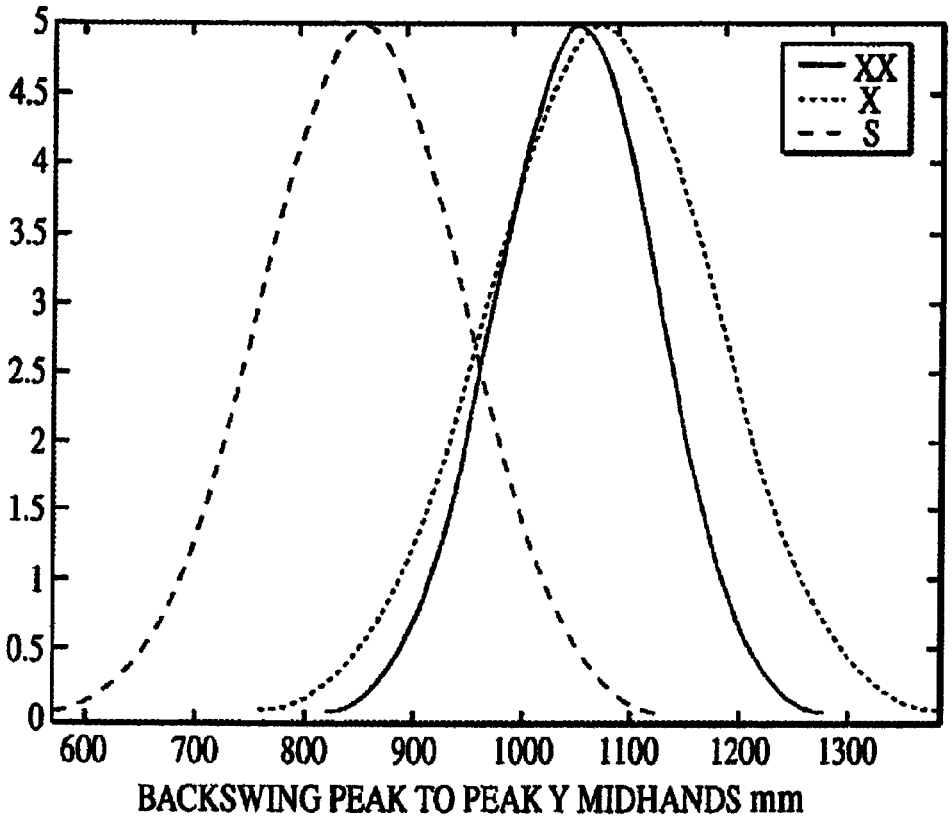
Figure 8E:
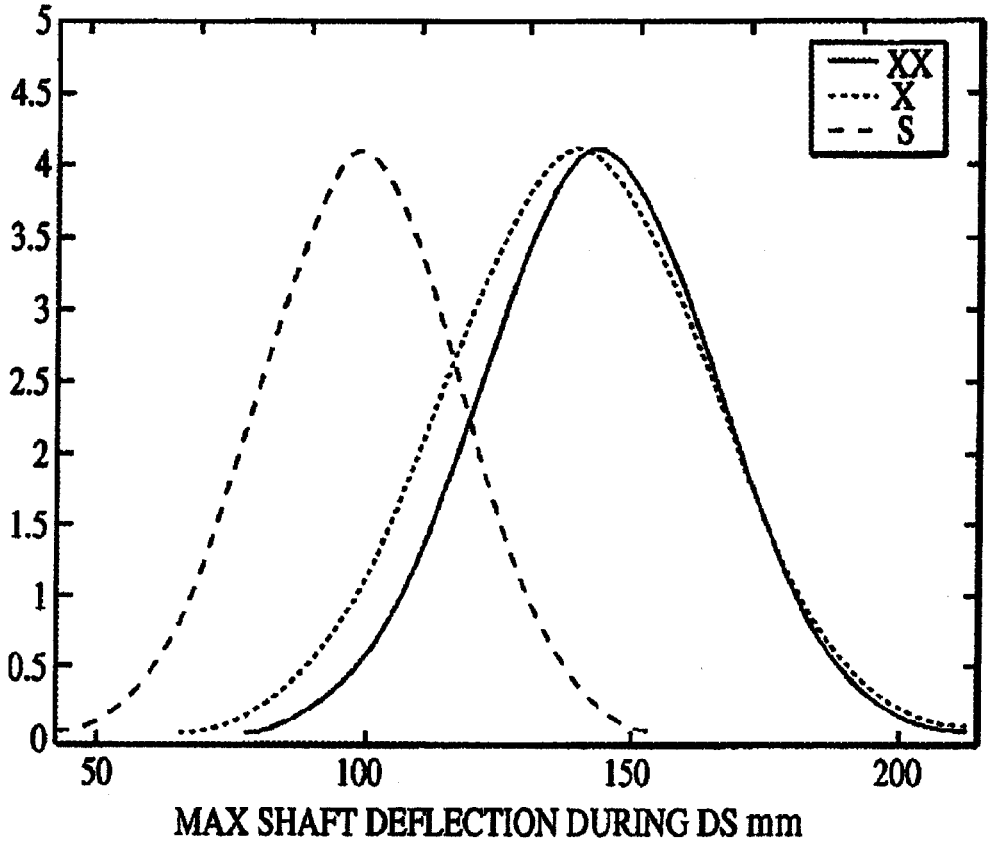

Similarly, FIG. 8E depicts the maximum shaft flex during the downswing, using a standard golf club provide to the golfers being tested. It will be noted in FIG. 8E that the previously fitted golfers who prefer a golf club having an S shaft flex generally exhibit a lower maximum shaft flex during the downswing than do the previously fitted golfers who prefer golf clubs having XX or X shaft flexes. The average of such fitted golfers preferring the S shaft flex have a maximum shaft flex during the downswing of about 100 mm.

It will be noted that the curves depicted in FIGS. 8A-8E all have Gaussian shapes. These curves are only approximations of the data actually accumulated for the previously fitted golfers. That actual data does not necessarily reflect a precisely Gaussian distribution. However, it is assumed that the distribution would be Gaussian if the performances of a sufficiently high number of golfers were analyzed. Therefore, a program is followed to determine the particular Gaussian curve that best fits the actual data provided. The resulting best-fit curves are depicted in the graphs.

It also will be noted that the Gaussian-shaped curves depicted in the graphs of FIGS. 8A-8E all have the same heights within each graph but different heights from graph to graph. This reflects the fact that some of the parameters represented in the graphs are considered more important than others. Those curves that are the highest are considered the most important and will have the biggest impact on the selection process.

It also will be noted that the parameter represented in the graph of FIG. 8C reflects a characteristic of the golfer to be fitted, himself, not a characteristic of such golfer's golf swing. In this case, the parameter is the golfer's handicap. Just as in the case of characteristics of the golfer's swing, such non-swing characteristics can be relied on advantageously to select the optimum golf club from the plurality of golf club styles.

Although only five parameters have been identified in this example as being used to match the golfer to be fitted with the optimal golf club selected from the group of golf club styles, it will be appreciated that other, additional parameters could be used as well. Other suitable swing-related parameters include: (1) speed of the center of the face of the club head at impact, (2) peak hand-speed during the downswing, (3) time duration of the downswing, (4) elevation angle of the backswing plane of the center of the face of the club head, (5) peak-to-peak vertical movement of the mid-hands during the downswing, and (6) time at which the shaft's kick deflection is zero. Other suitable non-swing parameters include: (1) the golfer's weight and (2) the golfer's height.

To properly fit the golfer, he or she swings a golf club several times, preferably at least five times, while the golfer and golf club are being continuously monitored using a three-dimensional motion analysis system, as described above. The resulting body and swing data is analyzed, and average values for the parameters represented in FIGS. 8A-8E are computed. Values representing non-swing related parameters, e.g., the golfer's handicap, also are recorded. All of these values then are compared with the stored data for the previously fitted golfers, as represented by the graphs of FIGS. 8A-8E.

For each of the five parameters, the value of the parameter determined for the golfer being fitted is compared with the weightings for the three golf club styles as depicted in the corresponding graph of FIGS. 8A-8E. Thus, for example, if the golfer being fitted is determined to have a rate of change of Theta-2 at the end of the downswing of 2400 degrees per second, then the weighting for the golf club having an S shaft is about 0.5, the weighting for the golf club having an X shaft is about 0.9, and the weighting for the golf club having an XX shaft is about 3.3.

This is repeated for each of the five parameters represented in FIGS. 8A-8E, and the weightings are totaled for each of the three golf club styles. Whichever golf club style provides the highest total is deemed the particular club most likely to be optimal for the golfer being fitted. This is the club, then, that is selected for that golfer.

It will be appreciated that this process enables the golfer to be fitted in a minimum of time, without the need for the golfer to individually test numerous different golf club styles on a driving range. Despite this efficiency, the fitting can be accomplished with good reliability. Sometimes, the process will result in paring down the selection not to just one golf club style, but instead to two or even three golf club styles as viable candidates. Even so, substantial time is saved in the fitting process.

Although the invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. For example, in the foregoing embodiments of the motion analysis system, it is to be noted that measurements may be taken relative to the golf club, as well as to a fixed coordinate system defined other than on the golf club. Thus, it is intended that the scope of the present invention herein disclosed should not be limited by the particular disclosed embodiments described above, but should be determined only by a fair reading of the claims that follow.

We claim:

1. A method comprising:

*using a processor-controlled motion analysis system,* determining a plurality of swing performance parameters for each of a plurality of test golfers, the plurality of swing performance parameters being determined from measurements obtained while each test golfer successively swings a plurality of dissimilar golf clubs, *wherein the measurements comprise at least one measurement of the test golfer's hand motion during the test golfer's golf swing*;

receiving from each of the plurality of test golfers the test golfer's golf club preference from among the plurality of dissimilar golf clubs;

correlating the test golfers' measured swing performance parameters and golf club preferences; and storing on a storage device a data set indicative of the correlation between the test golfers' measured swing performance parameters and golf club preferences, *wherein correlating includes classifying the test golfers into a plurality of golfer classification groups, each golfer classification group defined by a club head speed range, a maximum shaft deflection rage, a time of peak hand speed range, and a minimum hand speed range*.

2. The method of claim 1, wherein the golf club preference for each of the plurality of test golfers is based on [which golf club provided the best performance for that particular test golfer] *at least one of shaft weighting and shaft flexibility characteristics of the plurality of dissimilar golf clubs*.

3. The method of claim 1, wherein at least two golf clubs within the plurality of dissimilar golf clubs each has at least one different performance characteristic.

4. The method of claim 3, wherein at least two golf clubs within the plurality of dissimilar golf clubs each has a different shaft weight configuration.

5. The method of claim 4, wherein the shaft weight configuration [comprises] *includes at least one of* a total shaft weight [or] *and* a shaft weight distribution.

6. The method of claim 3, wherein at least two golf clubs within the plurality of dissimilar golf clubs each has a different shaft flex.

7. The method of claim 1, wherein each of the plurality of test golfers is provided with at least two golf club groups.

8. The method of claim 7, wherein golf clubs in the same golf club group have a similar shaft weight configuration, and wherein golf clubs in different golf club groups have dissimilar shaft weight configurations.

9. The method of claim 8, wherein the shaft weight configuration [comprises] *includes at least one of* a total shaft weight [or] *and* a shaft weight distribution.

10. The method of claim 7, wherein golf clubs in the same golf club group have a similar shaft flex, and wherein golf clubs in different golf club groups have dissimilar shaft flexes.

11. The method of claim 1, wherein each of the plurality of test golfers is provided with a first golf club group, a second golf club group, and a third golf club group.

12. The method of claim 11, wherein each golf club within the first golf club group has a first total shaft weight, each golf club within the second golf club group has a second total shaft weight, and each golf club within the third golf club group has a third total shaft weight.

13. The method of claim 12, wherein the first total shaft weight is less than the second total shaft weight, and the second total shaft weight is less than the third total shaft weight.

14. The method of claim 11, wherein each golf club within the first golf club group has a first shaft weight distribution, each golf club within the second golf club group has a second shaft weight distribution, and each golf club within the third golf club group has a third shaft weight distribution, and wherein the first, second and third shaft weight distributions are dissimilar.

15. The method of claim 11, wherein the first golf club group [comprises] *includes* a first golf club having a first shaft flex, a second golf club having a second shaft flex, and a third golf club having a third shaft flex, wherein the third shaft flex is stiffer than the second shaft flex, and the second shaft flex is stiffer than the first shaft flex.

16. The method of claim 11, wherein the second golf club group [comprises] *includes* a fourth golf club having a first shaft flex and a fifth golf club having a second shaft flex, and wherein the second shaft flex is stiffer than the first shaft flex.

17. The method of claim 13, wherein the third golf club group [comprises] *includes* a sixth golf club having a first shaft flex, a seventh golf club having a second shaft flex, and an eighth golf club having a third shaft flex, wherein the third shaft flex is stiffer than the second shaft flex and the second [shat] *shaft* flex is stiffer than the first shaft flex.

18. The method of claim 1, wherein a three dimensional motion analysis system is used to measure the one or more swing performance parameters.

[19. The method of claim 1, wherein the measurements include a time duration from the start of a test golfer's downswing to the time of peak hand speed, or a minimum speed of a test golfer's hands during a transition from the backswing to the downswing, or hand acceleration, or hand position during the swing, or timing and magnitude of wrist uncocking and hand rotation, or combinations thereof.]

20. The method of claim 1, wherein correlating [comprises] *includes* classifying the test golfers into a plurality of golfer classification groups, each golfer classification group defined by a range of values within each of a plurality of measured swing performance parameters.

21. The method of claim 20, wherein golfers within a golfer classification group generally prefer golf clubs with the same performance characteristics.

22. The method of claim 20, wherein correlating further comprises determining a relationship between each of the golfer classification groups and at least one golf club performance characteristic.

23. The method of claim 22, wherein the golf club performance characteristic comprises a shaft weight configuration.

24. The method of claim 23, wherein shaft weight corresponds to total shaft weight.

25. The method of claim 23, wherein shaft weight corresponds to shaft weight distribution.

26. The method of claim 23, wherein the at least one golf club performance characteristic comprises shaft flex.

27. The method of claim 20, wherein correlating further comprises determining a relationship between each of the golfer classification groups and at least one preferred golf club.

[28. The method of claim 1, wherein correlating comprises classifying the test golfers into a plurality of golfer classification groups, each golfer classification group defined by a club head speed range, a maximum shaft deflection range, a time of peak hand speed range, and a minimum hand speed range.]

29. The method of claim [28] *1*, wherein correlating further comprises determining a relationship between each of the golfer classification groups, a shaft weight, and a shaft flex.

30. The method of claim [28] *1*, wherein correlating further comprises determining a relationship between each of the golfer classification groups and at least one preferred golf club.

31. The method of claim 1, wherein correlating further comprises performing a statistical cluster analysis of the measured plurality of swing performance parameters and the golfers' golf club preferences.

[32. The method of claim 1, wherein the measurements comprise at least one measurement of the test golfer's hand motions during the test golfer's golf swing.]

* * * * *